US009780875B2

(12) United States Patent
Naruo et al.

(10) Patent No.: US 9,780,875 B2
(45) Date of Patent: Oct. 3, 2017

(54) VISIBLE LIGHT COMMUNICATION MODULATION CIRCUIT, ILLUMINATION DEVICE, ILLUMINATION APPARATUS AND VISIBLE LIGHT COMMUNICATION SYSTEM

(71) Applicant: Panasonic Intellectual Property Management Co., Ltd., Osaka (JP)

(72) Inventors: Masahiro Naruo, Osaka (JP); Shojirou Kido, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 222 days.

(21) Appl. No.: 14/843,458

(22) Filed: Sep. 2, 2015

(65) Prior Publication Data

US 2016/0072583 A1  Mar. 10, 2016

(30) Foreign Application Priority Data

Sep. 5, 2014  (JP) ................................. 2014-181359

(51) Int. Cl.
H05B 37/02  (2006.01)
H05B 39/00  (2006.01)
(Continued)

(52) U.S. Cl.
CPC ....... H04B 10/116 (2013.01); H05B 33/0845 (2013.01); H05B 37/0272 (2013.01)

(58) Field of Classification Search
CPC ...... H05B 2214/03; H05B 3/141; H05B 3/48; H05B 33/0815; H05B 33/0812;
(Continued)

(56) References Cited

U.S. PATENT DOCUMENTS

2003/0111969 A1* 6/2003 Konishi ............. H05B 41/2881
                                                                 315/291
2004/0251852 A1* 12/2004 Kambara ........... H05B 41/2882
                                                                 315/291
(Continued)

FOREIGN PATENT DOCUMENTS

JP  2006-210835 A  8/2006
JP  2007-200610 A  8/2007
(Continued)

Primary Examiner — Douglas W Owens
Assistant Examiner — Wei Chan
(74) Attorney, Agent, or Firm — Renner Otto Boisselle & Sklar, LLP

(57) ABSTRACT

A visible light communication modulation circuit includes a modulation resistance circuit configured to change a current flowing through an LED light source by changing a resistance thereof, a measurement circuit configured to simultaneously measure a voltage applied to the LED light source and the current flowing through the LED light source at least twice until the current is stabilized, an calculation circuit configured to obtain an equivalent series resistance of the LED light source based on at least two sets of voltage values and current values and determine a target resistance of the modulation resistance circuit based on the equivalent series resistance and a predetermined modulation degree, and a conversion circuit configured to change the resistance of the modulation resistance circuit based on the target resistance.

10 Claims, 11 Drawing Sheets

(51) Int. Cl.
*H04B 10/116* (2013.01)
*H05B 33/08* (2006.01)
(58) Field of Classification Search
CPC ............ H05B 33/0845; H05B 33/0851; H05B
33/0854; H05B 33/0887; H05B 33/089;
H05B 41/2928; H05B 41/2985; H05B
41/38; H05B 1/025
USPC .......... 315/224, 307, 291, 246, DIG. 4, 173,
315/185 R, 209 R, 209 T, 210, 297, 308
See application file for complete search history.

(56) References Cited

U.S. PATENT DOCUMENTS

| | | |
|---|---|---|
| 2007/0170876 A1 | 7/2007 | Ito et al. |
| 2010/0148691 A1* | 6/2010 | Kuo .................. H05B 33/0815 315/291 |
| 2014/0159586 A1 | 6/2014 | Kido |
| 2014/0286645 A1 | 9/2014 | Kido et al. |

FOREIGN PATENT DOCUMENTS

| | | |
|---|---|---|
| JP | 2013-110634 A | 6/2013 |
| JP | 2014-60877 A | 4/2014 |
| JP | 2014-135716 A | 7/2014 |

* cited by examiner

FIG. 9

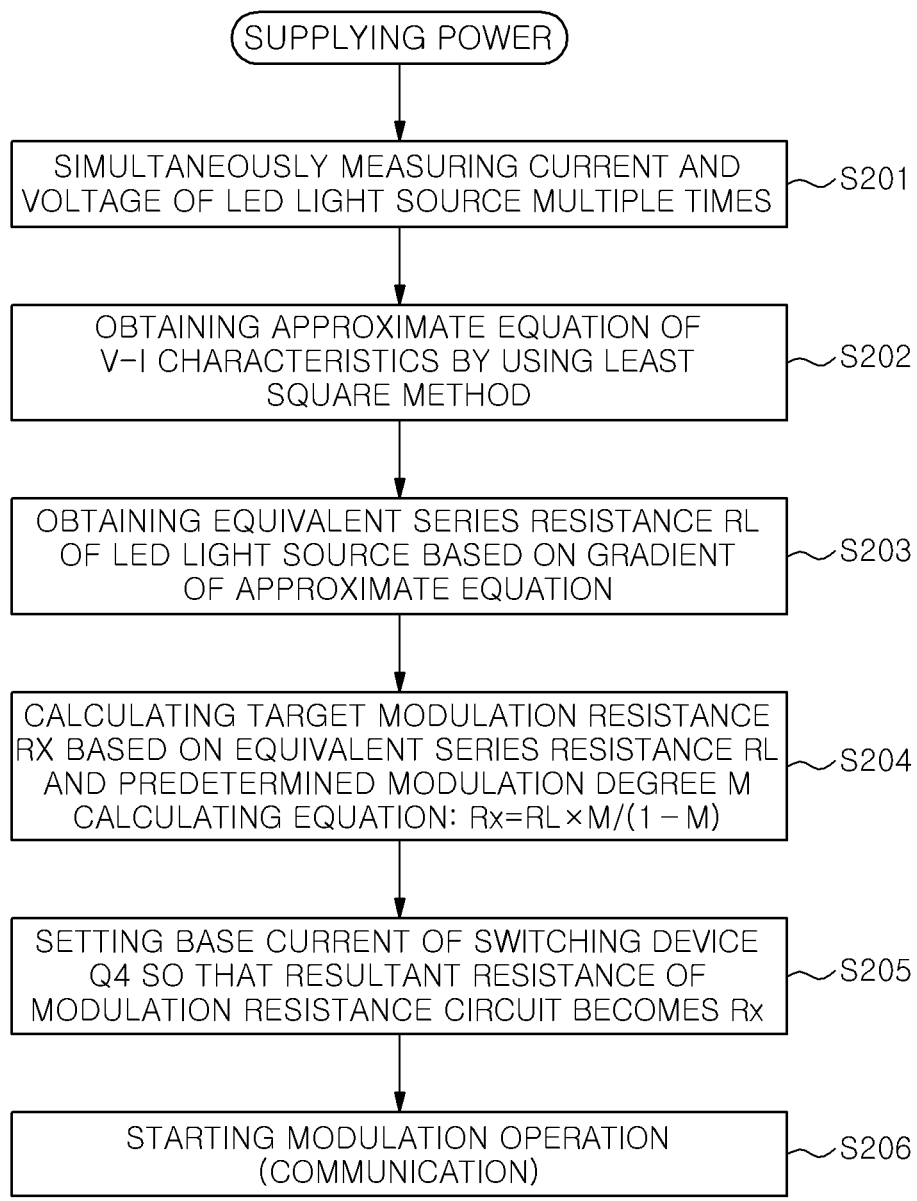

```
         ( SUPPLYING POWER )
                  │
                  ▼
┌─────────────────────────────────────────┐
│ SIMULTANEOUSLY MEASURING CURRENT AND    │─ S201
│ VOLTAGE OF LED LIGHT SOURCE MULTIPLE TIMES│
└─────────────────────────────────────────┘
                  │
                  ▼
┌─────────────────────────────────────────┐
│ OBTAINING APPROXIMATE EQUATION OF        │
│ V-I CHARACTERISTICS BY USING LEAST       │─ S202
│ SQUARE METHOD                            │
└─────────────────────────────────────────┘
                  │
                  ▼
┌─────────────────────────────────────────┐
│ OBTAINING EQUIVALENT SERIES RESISTANCE RL│
│ OF LED LIGHT SOURCE BASED ON GRADIENT    │─ S203
│ OF APPROXIMATE EQUATION                  │
└─────────────────────────────────────────┘
                  │
                  ▼
┌─────────────────────────────────────────┐
│ CALCULATING TARGET MODULATION RESISTANCE │
│ Rx BASED ON EQUIVALENT SERIES RESISTANCE RL│─ S204
│ AND PREDETERMINED MODULATION DEGREE M    │
│ CALCULATING EQUATION: Rx=RL×M/(1−M)      │
└─────────────────────────────────────────┘
                  │
                  ▼
┌─────────────────────────────────────────┐
│ SETTING BASE CURRENT OF SWITCHING DEVICE │
│ Q4 SO THAT RESULTANT RESISTANCE OF       │─ S205
│ MODULATION RESISTANCE CIRCUIT BECOMES Rx │
└─────────────────────────────────────────┘
                  │
                  ▼
┌─────────────────────────────────────────┐
│ STARTING MODULATION OPERATION            │─ S206
│ (COMMUNICATION)                          │
└─────────────────────────────────────────┘
```

VISIBLE LIGHT COMMUNICATION MODULATION CIRCUIT, ILLUMINATION DEVICE, ILLUMINATION APPARATUS AND VISIBLE LIGHT COMMUNICATION SYSTEM

CROSS-REFERENCE TO RELATED APPLICATIONS

This application claims priority to Japanese Patent Application No. 2014-181359 filed on Sep. 5, 2014, the entire contents of which are incorporated herein by reference.

TECHNICAL FIELD

The disclosure relates to a visible light communication modulation circuit used for visible light communication, an illumination device, an illumination apparatus, and a visible light communication system.

BACKGROUND ART

Conventionally, there is suggested an illumination apparatus capable of transmitting a signal by modulating an intensity of illumination light. The signal from the illumination apparatus is received by a receiving unit having a photodiode or a general-purpose image sensor, so that information can be transmitted from the illumination apparatus to the receiving unit. Such communication is referred to as "visible light communication".

In the visible light communication, a special device such as an infrared ray communication device or the like is not required. Power can be saved by using a light emitting diode (LED) as a light source. Therefore, it is attempted to use the visible light communication for a communication system in facilities such as an underground shopping center, a store and the like.

Japanese Unexamined Patent Application Publication No. 2014-35716 discloses an example of a visible light communication apparatus for performing the above-described visible light communication. The visible light communication apparatus disclosed in Japanese Unexamined Patent Application Publication No. 2014-135716 can easily change a modulation degree of a signal changing an impedance (resistance) of an impedance element connected to an LED light source and a power source. Accordingly, even if an illumination design is suddenly changed immediately before a lighting device is installed, for example, an adequate visible light communication environment can designed without exchanging impedance elements.

In a known visible light communication apparatus, modulation degrees of LED light source series having a common rated current can be set to desired levels by single modulation circuit. However, different types of LED light sources having different rated currents cannot be dealt with a single modulation circuit.

SUMMARY OF THE INVENTION

In view of the above, the disclosure provides a visible light communication modulation circuit capable of setting modulation degrees of different types of LED light source having different rated currents to desired levels by a single modulation circuit.

A visible light communication modulation circuit for use in an illumination device for performing visible light communication includes a modulation resistance circuit connected to a power circuit and an LED light source and configured to change a current flowing through the LED light source in response to a change of a resistance of the modulation resistance circuit, a measurement circuit configured to simultaneously measure a voltage applied to the LED light source and the current flowing through the LED light source at least twice until the current flowing through the LED light source is stabilized after start-up of the visible light communication modulation circuit, an calculation circuit configured to obtain an equivalent series resistance of the LED light source based on at least two sets of voltage values and current values measured by the measurement circuit and determine a target resistance of the modulation resistance circuit based on the equivalent series resistance and a predetermined modulation degree of the current flowing through the LED light source, and a conversion circuit configured to change the resistance of the modulation resistance circuit based on the target resistance determined by the calculation circuit.

In the embodiment of the disclosure, it is possible to set modulation degrees of different types of LED light source having different rated currents to desired levels by a single modulation circuit.

BRIEF DESCRIPTION OF THE DRAWINGS

The figures depict one or more implementations in accordance with the present teaching, by way of example only, not by way of limitations. In the drawings, like reference numerals refer to the same or similar elements.

FIG. 9 is a flowchart showing a modulation degree control operation of the visible light communication modulation circuit 120.

DETAILED DESCRIPTION

Figure 1A:
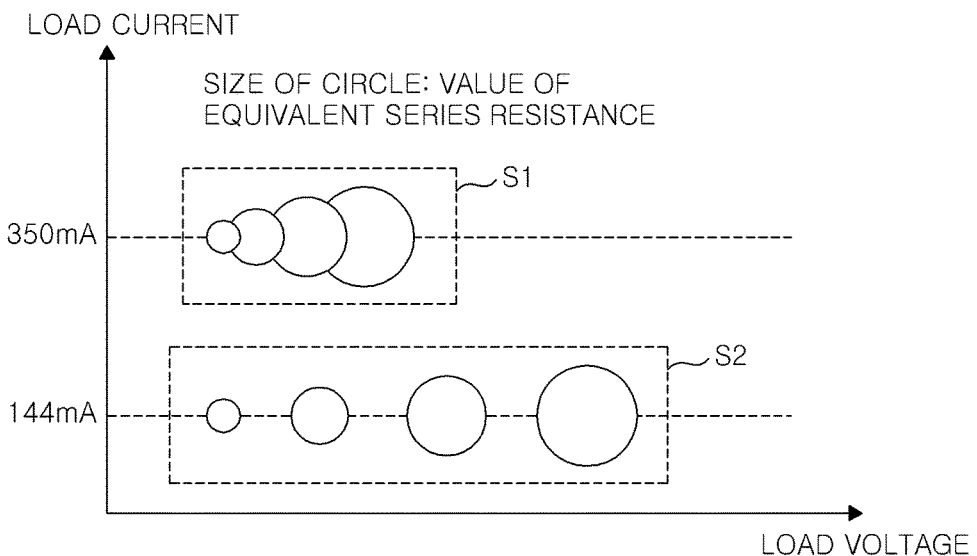
FIG. 1A schematically shows relation between a load voltage and a load current of LED light source series S1 having a common rated current and LED light sources series S2 having a common rated current.

The studies of the present inventors will be described prior to the description of embodiments of the disclosure.

In order to perform communication using illumination light, it is required to modulate an intensity of the illumination light by a modulation degree set based on performance of a receiver. Here, a modulation degree M is expressed by an equation $M=(Ih-Il)/Ih$, wherein Ih indicates a current flowing through an LED light source when the intensity of the illumination light is in a high state and Il indicates a current flowing through the LED light source when the intensity of the illumination light is in a low state. When the receiver is a camera having an image sensor, the modulation degree M is set to 0.5 or above, for example. When the receiver is a photodiode for use in visible light communication, the modulation degree M is set to be within a range from 0.1 to 0.3, for example. In order to set the modulation degree to a predetermined value, it is required to change a resistance of a modulation circuit connected to the LED light source. The resistance is determined based on a load of the LED light source (equivalent series resistance).

An LED illumination device is classified into a type in which an LED light source can be exchanged and a type in which an LED light source cannot be exchanged. An LED light source for use in the LED illumination device of the former type may be, e.g., an LED bulb and a straight-tube LED lamp. Such an exchangeable LED light source includes different types of LED light sources having different maximum light emitting amounts. A rated consumption power of an LED power source may be often used as an index for distinguishing the types of LED light sources. For example, the straight-tube LED lamp has three types of rated outputs, i.e., 13 W, 19 W and 22 W. As the rated output is increased, the maximum light emitting amount is increased and a rated lamp voltage is increased.

There are illumination devices whose diming level can be controlled. The diming level is expressed as a current ratio or a light amount ratio in the case of setting the ratio of the rated output to 100%. As the dimming level is decreased, an applied voltage of the LED light source (hereinafter, referred to as "load voltage") is decreased. Generally, LED light sources of the same type have the same level of current flowing therethrough (hereinafter, referred to as "load current") at the same dimming level and have different load voltages depending on rated outputs. Therefore, the types of LED light sources can be distinguished based on the load voltage. Japanese Unexamined Patent Application Publication No. 2014-135716 discloses that the types of LED light sources are distinguished based on the load voltage after the load current is stabilized. The visible light communication apparatus disclosed in Japanese Unexamined Patent Application Publication No. 2014-135716 sets a modulation degree to a predetermined level by changing a resistance of a modulation circuit (impedance element) based on a detected load voltage.

However, the above method based on the load voltage in stable operation can be applied only to LED light source series having a common rated current. Different types of LED light sources having different rated currents may have different load currents even when they have the same load voltage. Therefore, it is not possible to distinguish LED light sources only based on the load voltage.

Figure 1B:
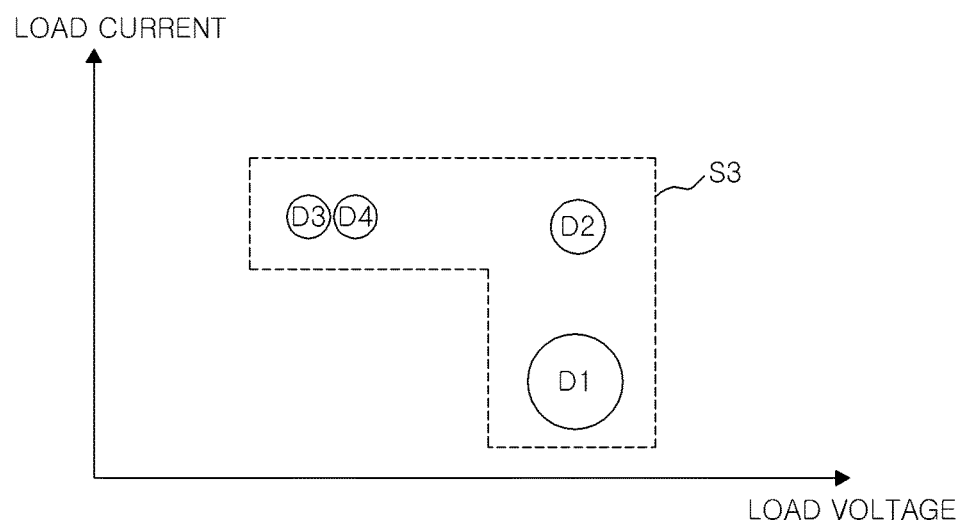
FIG. 1B schematically shows relation between a load voltage and a load current of LED light source series S3 having different rated currents.

FIGS. 1A and 1B are views for explaining the above-described drawback. FIG. 1A schematically shows relation between a load voltage and a load current in LED light source series S1 having a common rated current and LED light source series S2 having a common rated current. FIG. 1B schematically shows relation between a load voltage and a load current in LED light source series S3 having different rated currents. In FIGS. 1A and 1B, each circle indicates a single LED product. A size of a circle indicates a value of an equivalent series resistance of an LED light source.

Conventionally, each device series has a common rated current as in the case of the series S1 and S2 shown in FIG. 1A. Therefore, the equivalent series resistance of the LED light source can be determined by measuring a voltage in stable operation and the modulation resistance can be set to an adequate value based on the determination result.

Recently, however, there are device series having different rated currents as in the case of the series S3 including devices D1 to D4 shown in FIG. 1B. Further, there are device series having a common rated current in which the load voltage is not in direct proportion to the equivalent series resistance of the LED light source. It is difficult to automatically distinguish such series by a conventional method based on the load voltage in stable operation. For example, devices D1 and D2 shown in FIG. 1B have substantially the same load voltage but have different load currents. Therefore, it is not possible to distinguish types of the devices only based on the information of the load voltage.

The present inventors have examined a configuration capable of solving the above-described drawback. The present inventors have found that the equivalent series resistance can be directly obtained from the voltage-current characteristics of the LED light source in a transition period in which the load current is not stabilized immediately after start-up and have conceived the technique of the disclosure. The visible light communication modulation circuit according to the embodiment performs an operation of simultaneously measuring a load voltage and a load current at least twice in the transition period until the load current is stabilized after the start-up. The equivalent series resistance of the LED light source is obtained based on the measurement result. Then, a target value of a modulation resistance is determined by an operation based on a predetermined modulation degree and the obtained equivalent series resistance. With the above-described processes, modulation degrees of a plurality of LED light sources having different rated currents can be set to predetermined levels by a single visible light communication modulation circuit.

Hereinafter, a basic configuration of an embodiment of the disclosure will be described. In this specification, "communication" denotes uni-directional signal transmission as well as bi-directional signal transmission. In the following description, "connection" denotes electric connection.

Figure 2:
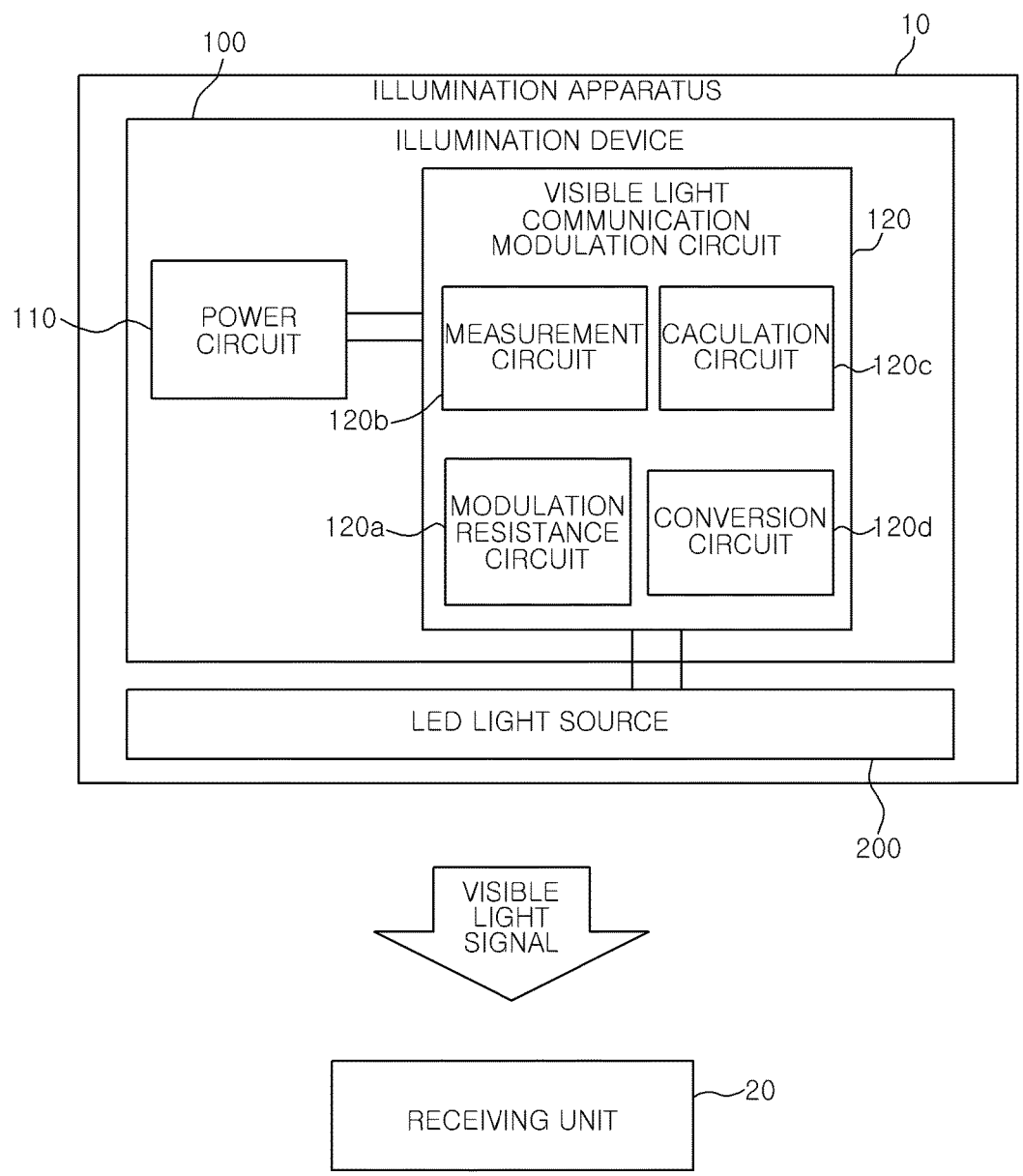
FIG. 2 is a block diagram showing a schematic configuration of a visible light communication system according to one aspect of the disclosure.

FIG. 2 is a block diagram showing a schematic configuration of a visible light communication system according to an embodiment of the disclosure. The visible light communication system includes: an illumination apparatus 10; and a receiving unit 20 for receiving a signal transmitted from the illumination apparatus 10 (hereinafter, referred to as "visible light signal" or "communication signal"). The illumination apparatus 10 has an illumination device 100 and an LED light source 200 attached to the illumination device 100. The illumination device 100 has an power circuit 110 for supplying power for driving the LED light source 200 and a visible light communication modulation circuit 120 for modulating a current flowing through the LED light source 200. The receiving unit 20 has a camera having a general-purpose image sensor or a photodiode for use in visible light communication, for example. The illumination apparatus 10 turns on the LED light source 200 and modulates the intensity thereof. Accordingly, a visible light signal is transmitted to the receiving unit 20.

The visible light communication modulation circuit 120 has four circuit blocks, i.e., a modulation resistance circuit 120a, a measurement circuit 120b, a calculation circuit 120c, and a conversion circuit 120d. The modulation resistance circuit 120a is connected to the LED light source 200 and the power circuit 110 and configured to change a current flowing through the LED light source 200 by changing a resistance of the modulation resistance circuit 120a. The measurement circuit 120b is configured to perform an operation of simultaneously measuring a voltage applied to the LED light source 200 and a current flowing through the LED light source 200 at least twice until the current flowing through the LED light source 200 is stabilized after the start-up. The calculation circuit 120c is configured to obtain an equivalent series resistance of the LED light source 200 based on at least two sets of voltages and currents measured by the measurement circuit 120b and determine a target resistance (resultant resistance) of the modulation resistance circuit 120a based on the obtained equivalent series resistance and a predetermined modulation degree. The conversion circuit 120d is configured to change the resistance of the modulation resistance circuit 120a based on the resistance determined by the calculation circuit 120c.

Figure 3:
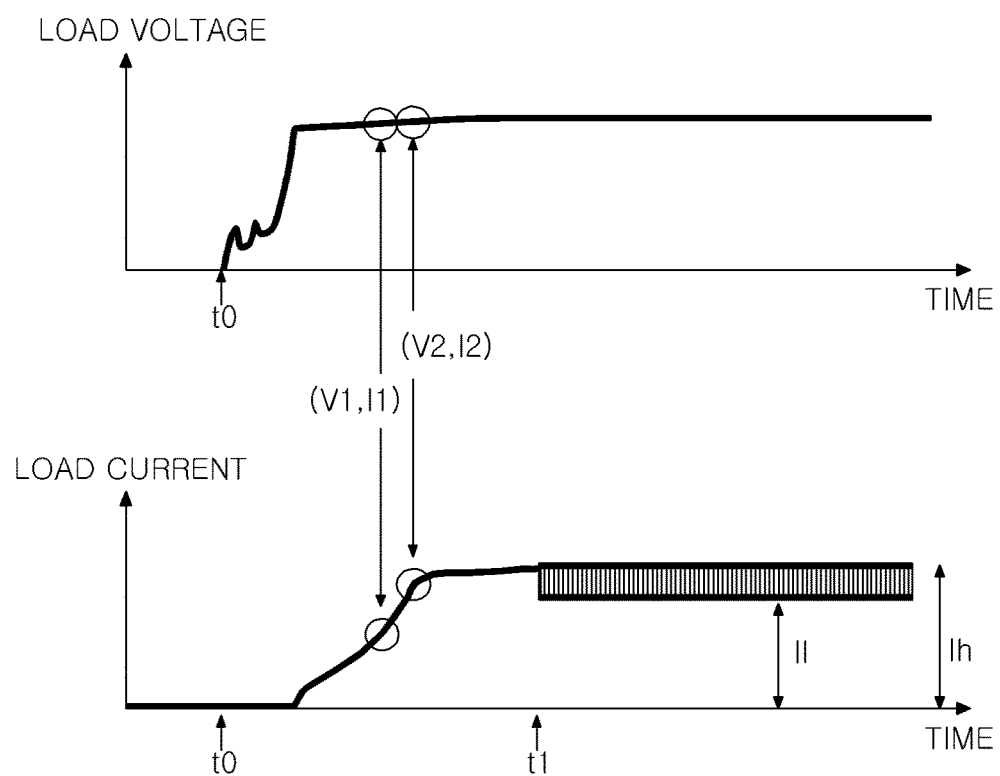
FIG. 3 shows an example of an operation of a visible light communication modulation circuit 120.

FIG. 3 shows an example of the operation of the visible light communication modulation circuit 120. Specifically, FIG. 3 shows an example of a temporal change of a load voltage and an example of a temporal change of a load current. In this example, power is inputted at a timing t0 to start the visible light communication modulation circuit 120. The load voltage is first increased and, then, the load current is increased. The load current is gradually increased compared to the load voltage. In other words, a period of time required until the load current is stabilized is longer than that required until the load voltage is stabilized. In FIG. 3B, a timing at which the load current is stabilized is expressed as t1. Whether or not the load current is stable is determined by whether or not a rate of temporal change of the load current is smaller than or equal to a predetermined threshold value. A period from the timing t0 to the timing t1 is about 1 second to several seconds, for example. When the timing exceeds t1, the visible light communication modulation circuit 120 starts a modulation operation for communication. As described above, the modulation degree M is expressed by $M=(Ih-Il)/Ih$, wherein Ih indicates a load current in a high state and Il indicates a load current in a low state.

In the embodiment of the disclosure, the measurement circuit 120b performs an operation of simultaneously measuring a load voltage and a load current at least twice until the load current is stabilized after the start-up. In FIG. 3, a voltage value and a current value obtained by first measurement are denoted by V1 and I1, respectively. Further, a voltage value and a current value obtained by second measurement are denoted by V2 and I2, respectively.

Figure 4:
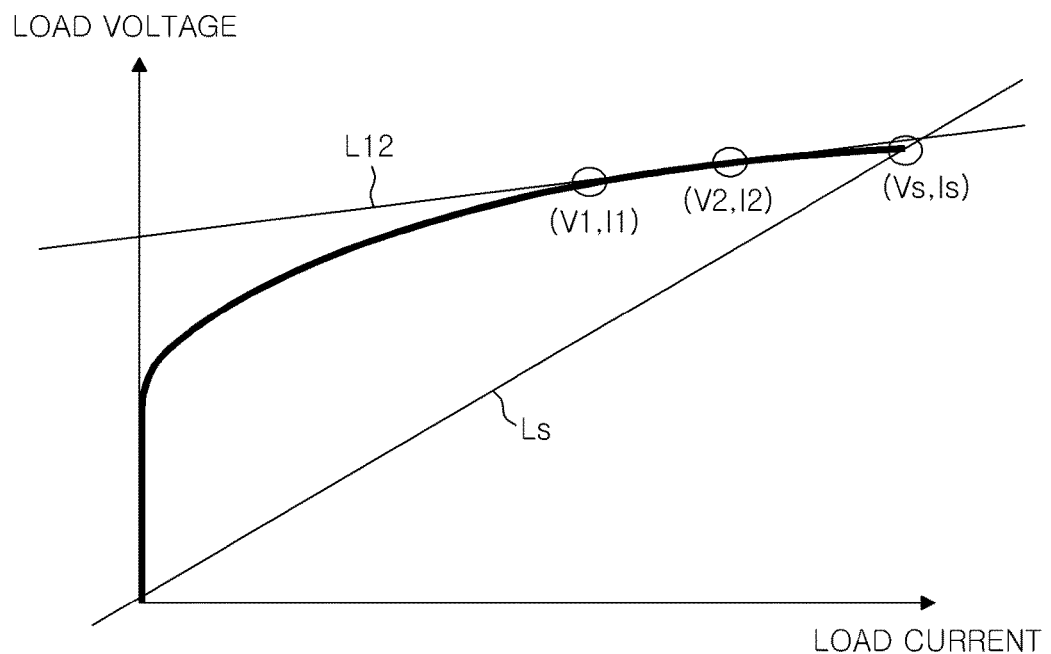
FIG. 4 shows an example of voltage-current characteristics of an LED light source 200.

FIG. 4 shows an example of voltage-current characteristics of the LED light source 200. When a voltage applied to the LED light source 200 exceeds a predetermined threshold value, a current starts to flow through the LED light source 200. The equivalent series resistance of the LED light source 200 can be obtained from a gradient of a graph showing the voltage-current characteristics. Such a gradient can be approximately obtained based on the two sets of voltage values and current values V1, I1, V2, and I2 measured by the calculation circuit 120c. In other words, a gradient of a straight line L12 passing through a point (V1, I1) and a point (V2, I2) shown in FIG. 4 can be obtained as an approximate value of the equivalent series resistance.

Here, the calculation circuit 120c of the present embodiment obtains an equivalent series resistance RL of the LED light source 200 by the following equation (1) based on the two sets of voltage values and current values V1, I1, V2, and I2 measured by the measurement circuit 120b.

$$RL=(V2-V1)/(I2-I1) \qquad \text{Eq. (1)}$$

When the LED light source 200 has a series circuit of a plurality of light emitting devices, the equivalent series resistance RL is expressed by $RL=N \times R1$, wherein Ri indicates an equivalent series resistance of each light emitting device and N indicates the number of light emitting devices.

The calculation circuit 120c of the present embodiment directly obtains the equivalent series resistance RL from the voltage-current characteristics of the LED light source in the transition period in which the load current is not stabilized immediately after the start-up. Here, an accurate equivalent series resistance RL cannot be obtained even if a gradient of a straight line Ls shown in FIG. 4 is obtained only based on a load voltage Vs and a load current Is in a state where the load current is stabilized. This is because the gradient of the straight line Ls passing through the origin and the point (Vs, Is) is different from a gradient of a curved line showing actual voltage-current characteristics. As in the present embodiment, the gradient of the curved line showing the voltage-current characteristics can be firstly obtained by using at least two sets of measured voltage values and current values.

The calculation circuit 120c determines a target resistance of a modulation resistor Rx (a resultant resistance) of the modulation resistance circuit 120a by using the following equation (2) based on the obtained equivalent series resistance RL and a predetermined modulation degree M determined by the receiving unit.

$$M=Rx/(Rx-RL) \qquad \text{Eq. (2)}$$

The Eq. (2) is modified to the following Eq. (3).

$$Rx=RL \times M/(1-M) \qquad \text{Eq. (3)}$$

Therefore, the target resistance of the modulation resistor Rx can be obtained from the Eq. (3).

The Eq. (2) is derived as follows. First, the modulation degree M is expressed by $M=(Ih-Il)/Ih=1-Il/Ih$.

Figure 5A:
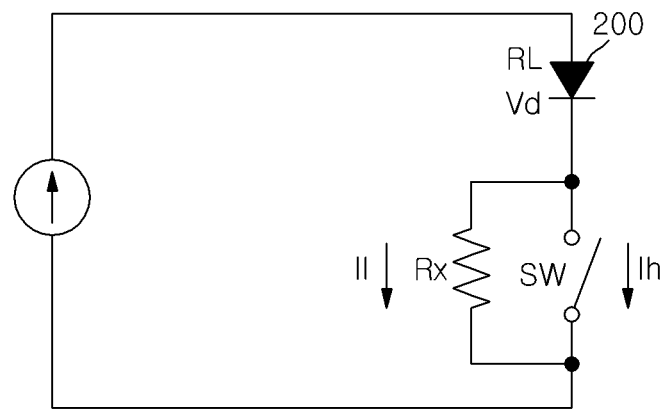
FIG. 5A schematically shows a circuit of an illumination apparatus 10.
Figure 5B:
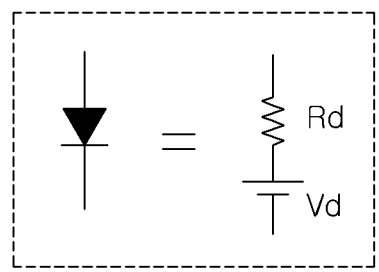
FIG. 5B shows an equivalent circuit of the LED light source 200.

The circuit of the illumination apparatus 10 is schematically illustrated in FIG. 5A. As can be seen from FIG. 5B, the LED light source 200 (light emitting diode) may be considered as combination of a resistor Rd and a voltage Vd. The LED light source 200 is connected in series to a switch SW. The modulation resistor Rx is connected in parallel to the switch SW. A state where the switch SW is closed is a high state (load current Ih). A state where the switch SW is opened is a low state (load current Il). The following two equations are satisfied on the assumption that V01 indicates a power voltage in the closed state of the switch SW and V02 indicates a power voltage in the open state of the switch SW.

$$Ih \times Rd+Vd=V01$$

$$Il \times (Rd+Rx)+Vd=V02$$

Since the switch is opened or closed in a short period of time, V01 is considered to be substantially equal to V02. Therefore, an equation $Ih \times Rd=Il \times (Rd+Rx)$ is satisfied and an equation Il/Ih=Rd/(Rd+Rx) can be obtained therefrom. As a result, the equation M=1−Il/Ih=Rx/(Rx+RL) is derived as the Eq. (2).

The conversion circuit 120d changes the resultant resistance of the modulation resistance circuit 120a based on the target resistance of the modulation resistor Rx determined by the calculation circuit 120c. For example, when the resultant resistance of the modulation resistance circuit 120a can be selected among a plurality of resistances, the conversion circuit 120d converts the resultant resistance of the modulation resistance circuit 120a to a value closest to the determined the target resistance of the modulation resistor Rx in a range within which the resistance of the modulation resistor Rx is configurable. Accordingly, the visible light communication can be performed with the predetermined modulation degree M. The conversion circuit 120d starts the modulation operation for communication after the load current is stabilized. This operation corresponds to the operation of opening/closing the switch SW shown in FIG. 5A.

Figure 6:
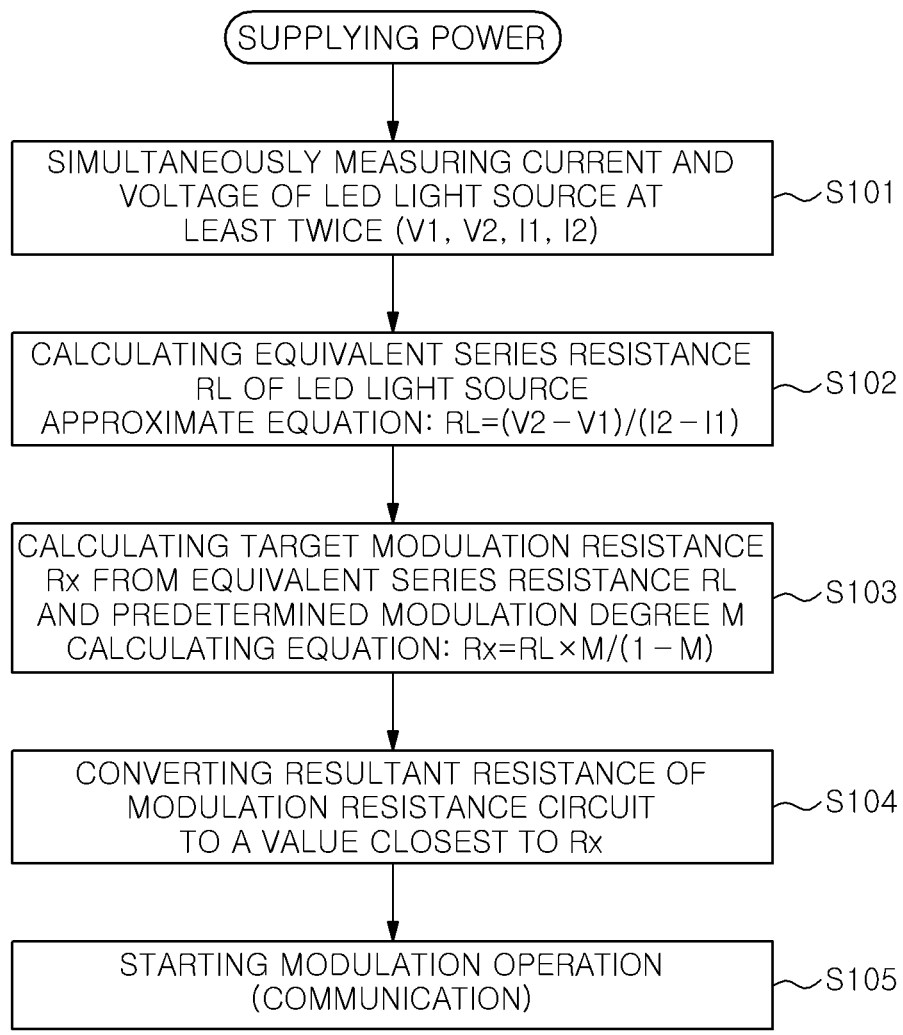
FIG. 6 is a flowchart showing an operation of a modulation resistor.

FIG. 6 is a flowchart showing the above-described operations. When the power is inputted, the measurement circuit 120b simultaneously measures a current and a voltage of the LED light source 200 at least twice. As a consequence, the measurement values V1, I1, V2, and I2 are obtained (step S101). Next, the calculation circuit 120c calculates the equivalent series resistance RL of the LED light source 200 based on the Eq. (1) (step S102). Then, the calculation circuit 120c calculates the target resistance of the modulation resistor Rx (target modulation resistance) from the equivalent series resistance RL and the predetermined modulation degree M based on the Eq. (3) (step S103). Thereafter, the conversion circuit 120d converts the resultant resistance of the modulation resistance circuit 120a to a value closest to the target resistance of Rx (step S104). Accordingly, the conversion circuit 120d starts the modulation operation (communication) with the predetermined modulation degree M (step S105).

With the above-described configuration and operation, modulation resistances of multiple LED light sources having different rated currents can be automatically set to adequate values. Unlike the related art, the embodiment of the disclosure can be used for series having different rated currents as well as series having a common rated current. Therefore, various devices can be dealt with without exchanging the modulation circuit.

In the above-described example, the voltage and the current are measured before the load current is stabilized. However, the second measurement may be performed after the load current is stabilized. Further, it is possible to obtain an approximate equation of the voltage-current characteristics by simultaneously measuring a voltage and a current about 1000 times or more, for example, and then obtain an equivalent series resistance from a gradient of the approximate equation. In that case, the modulation resistance can be set more accurately. It is not necessary to completely simultaneously measure the voltage and the current and a slight time lag may occur. The above-described processes can be performed as long as a time difference between the voltage measurement and the current measurement is short enough to substantially avoid changes in the voltage and the current.

Hereinafter, the embodiment of the disclosure will be described in detail.

First Embodiment

Figure 7:
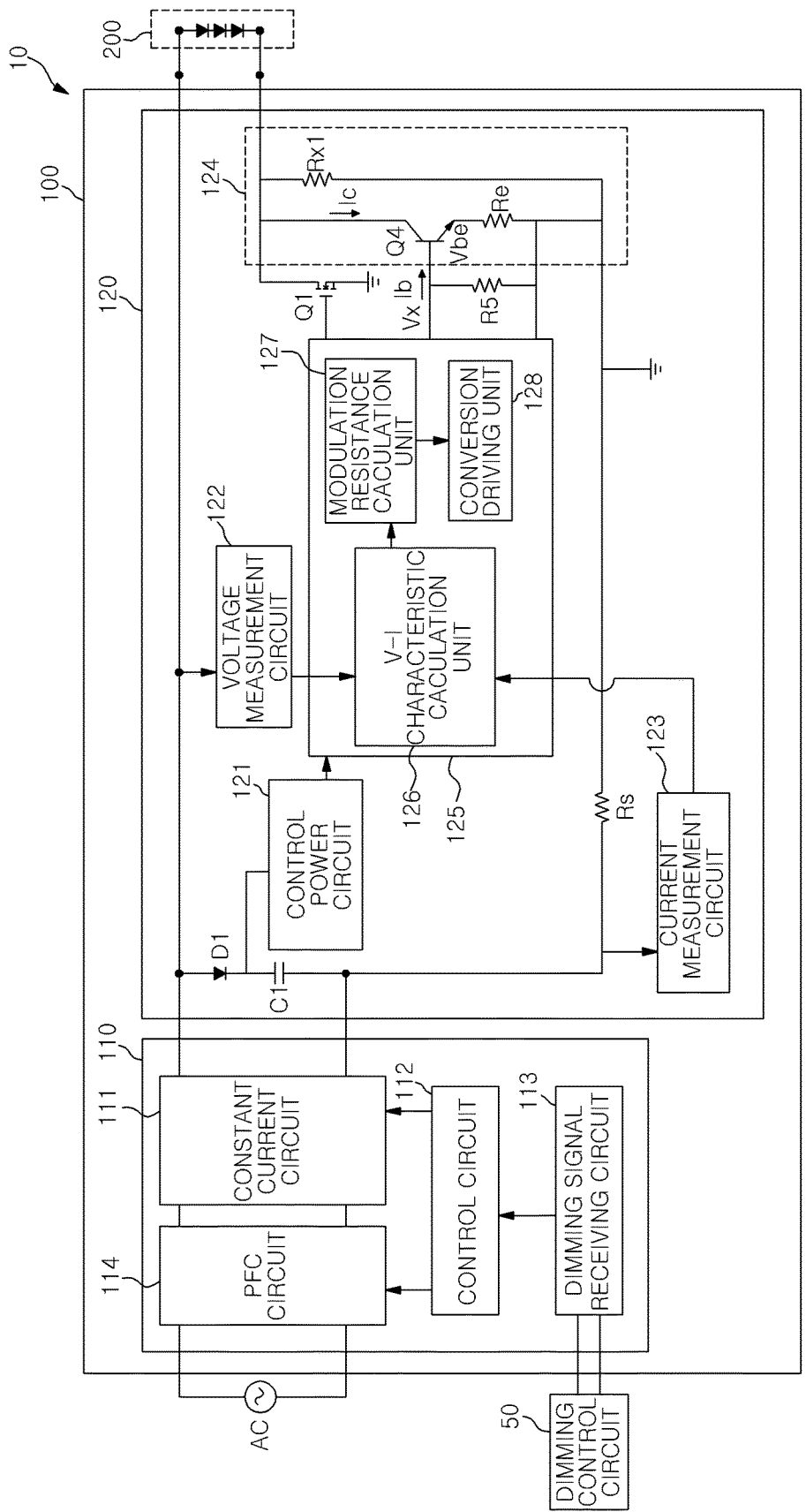
FIG. 7 is a circuit diagram showing a configuration of an illumination apparatus 10 according to a first embodiment.

FIG. 7 is a circuit diagram showing a configuration of an illumination apparatus 10 according to a first embodiment. The illumination apparatus 10 includes: an illumination device 100 and an LED light source 200 connected to the illumination device 100. The illumination device 100 has a power circuit 110 and a visible light communication modulation circuit 120. The visible light communication modulation circuit 120 is connected between the power circuit 110 and the LED light source 200.

In the present embodiment, the LED light source 200 has one or more light emitting diodes connected in series. However, the configuration of the LED light source 200 is not limited thereto. For example, there may be employed a configuration in which a plurality of series circuits, each having one or more light emitting diodes, is connected in parallel. Each light emitting element of the LED light source 200 is not limited to a light emitting diode made of an inorganic material and may also be another light emitting element such as an organic EL (OLED) device, a semiconductor laser or the like.

The power circuit 110 supplies a power for driving the LED light source 200. The power circuit 110 is connected to a commercial power supply AC. The power circuit 110 converts an AC current supplied from the commercial power supply AC to a DC current and supplies a constant current to the LED light source 200. The power circuit 110 is a switching power supply having a power factor correction (PFC) circuit 114, a constant current circuit 111, a control circuit 112 for controlling such circuits, and a dimming signal receiving circuit 113 for receiving a dimming signal. The constant current circuit 111 may have a DC/DC converter such as a step-back chopper circuit or the like. The dimming signal receiving circuit 113 receives a dimming signal outputted from an external dimming control circuit 50, reads out a dimming level from the dimming signal, and notifies the control circuit 112 of the read-out dimming level. The control circuit 112 controls the constant current circuit 111 such that a current flowing through the LED light source 200 has a value corresponding to the dimming level notified from the diming signal receiving circuit 113. Accordingly, the output voltage and the output current of the power circuit 110 are maximized when the dimming level is 100% (rated output) and decreased as the dimming level is decreased. A smoothing capacitor C1 of the visible light communication modulation circuit 120 is connected in parallel to an output terminal of the power circuit 110. The smoothing capacitor C1 removes a ripple of the DC current outputted from the power circuit 110.

The visible light communication modulation circuit 120 is a circuit for superposing a signal with illumination light by modulating the current flowing through the LED light source 200. The visible light communication modulation circuit 120 includes a control power circuit 121, a voltage measurement circuit 122, a current measurement circuit 123, a modulation resistance circuit 124, and a signal processing circuit 125. The combination of the voltage measurement circuit 122 and the current measurement circuit 123 corresponds to the measurement circuit 120b shown in FIG. 2. The signal processing circuit 125 and the modulation resistance circuit 124 are connected via a switching device Q1.

The control power circuit 121 converts a voltage inputted from the power circuit 110 through the diode D1 into a controlling voltage (e.g., 5V) used by the signal processing circuit 125 and outputs the controlling voltage. The control power circuit 121 may be, e.g., a DC/DC converter.

The voltage measurement circuit 122 measures a load voltage applied from the power circuit 110 to the LED light source 200. The voltage measurement circuit 122 may be a series circuit of a plurality of resistors connected in parallel to the power circuit 110. The voltage measurement circuit 122 divides the output voltage of the power circuit 110 and transmits the divided voltage to the signal processing circuit 125. When the switching device Q1 is in a conducting state (ON), the output voltage of the power circuit 110 becomes substantially the same as the voltage applied to the LED light source 200. Therefore, the voltage obtained by dividing the output voltage of the power circuit 110 is in direct proportion to the voltage applied to the LED light source 200.

The current measurement circuit 123 measures a load current flowing through the LED light source 200. The current measurement circuit 123 is configured to measure the load current based on a voltage decrease of a detection resistor RS disposed between a low potential side of the smoothing capacitor C1 and a low potential side of the LED light source 200.

The signal processing circuit 125 performs processes required for visible light communication. The signal processing circuit 125 may be realized by a microcontroller including a CPU (Central Processing Unit) and a memory for storing various programs. The microcontroller realizes various functions to be described later by executing programs stored in the memory by using the CPU. The signal processing circuit 125 is driven by a controlling voltage supplied from the control power circuit 121.

The signal processing circuit 125 has a V-I characteristic calculation unit 126, a modulation resistance calculation unit 127, and a conversion driving unit 128. The combination of the V-I characteristic calculation unit 126 and the modulation resistance calculation unit 127 corresponds to the calculation circuit 120c shown in FIG. 2. The conversion driving unit 128 and a switching device Q4 correspond to the conversion circuit 120d shown in FIG. 2. Such function units are not necessarily independent circuit elements and may be realized by executing a part of the programs by the signal processing circuit 125.

The V-I characteristic calculation unit 126 obtains the voltage-current characteristics (V-I characteristics) of the LED light source 200 based on the measurement values of the voltage measurement circuit 122 and the current measurement circuit 123. The V-I characteristic is a function describing the relation between a voltage applied to the LED light source 200 and a current flowing through the LED light source 200. The V-I characteristics are expressed by a curved line shown in FIG. 4, for example. The V-I characteristic calculation unit 126 of the present embodiment obtains an approximate equation of the V-I characteristics from the voltage values and the current values consecutively measured by the voltage measurement circuit 122 and the current measurement circuit 123, respectively.

The modulation resistance calculation unit 127 obtains the equivalent series resistance of the LED light source 200 from a gradient of the approximate equation of the V-I characteristics obtained by the V-I characteristic calculation unit 126. The modulation resistance of the modulation resistance circuit 124 is calculated from the obtained equivalent series resistance and the predetermined modulation degree by using the aforementioned Eq. (3).

The conversion driving unit 128 is connected to switching devices Q1 and Q4. The conversion driving unit 128 outputs a binary communication signal to the switching device Q1. The communication signal is obtained by binarizing information such as position information of an indoor illumination device or device information, e.g., a product code of an illumination device or the like. A user can use the information of the communication signal by receiving illumination light superposed with the communication signal through a receiving unit (e.g., an information communication terminal such as a mobile phone, a smart phone or the like) of the user.

The switching device Q1 includes an N-channel MOSFET. The switching device Q1 is connected in parallel to the modulation resistance circuit 124. The communication signal is inputted from the conversion driving unit 128 to a gate of the switching device Q1. When the switching device Q1 is in a conducting state (ON), a current flows through the LED light source 200 without passing through resistors Rx1 and Re in the modulation resistance circuit 124. On the other hand, when the switching device Q1 is in a non-conducting state (OFF), a current flows through the LED light source 200 via at least one of the resistors Rx1 and Re. Accordingly, the current flowing through the LED light source 200 is modulated and the signal is transmitted.

The conversion driving unit 128 of the present embodiment controls a resistance (resultant resistance) of the resistance modulation circuit 124 such that the signal is transmitted with a predetermined modulation degree before the visible light communication is performed. Specifically, the conversion driving unit 128 controls a base current Ib of the switching device Q4 such that the resultant resistance of the resistance modulation circuit 124 becomes closest to the target resistance of the modulation resistance circuit obtained by the modulation resistance calculation unit 127.

The modulation resistance circuit 124 has the two resistors Rx1 and Re and the switching device Q4. The switching device Q4 is an NPN-type bipolar transistor. The switching device Q4 serves as a variable resistor.

The resistor Rx1 is disposed between a ground and a connection node between the switching device Q1 and the LED light source 200. A collector of the switching device Q4 is connected to the connection node between the switching device Q1 and the LED light source 200. An emitter of the switching device Q4 is connected to the ground via the emitter resistor Re. A base of the switching device Q4 is connected to the ground via a resistor R5. Further, the base of the switching device Q4 is connected to the conversion driving unit 128 of the signal processing circuit 125. A driving voltage Vx is applied from the conversion driving unit 128 to the base of the switching device Q4. Accordingly, a base current $Ib(=(Vx-Vbe)/Re)$ is supplied from the conversion driving unit 128 to the base of the switching device Q4. Here, Vbe indicates a voltage between the emitter and the base of the switching device Q4 and Re indicates a resistance of the emitter resistor Re. A collector current Ic $(=hFE \times Ib)$ flows through the collector of the switching device Q4. Here, hFE denotes a DC current amplification factor.

With this configuration, as the driving voltage Vx is increased, the base current Ib is increased. As the base current Ib is increased, the collector current Ic is increased. In the case of considering the switching device Q4 as a variable resistor, as the driving voltage Vx is increased, the resistance of the variable resistor is decreased and, thus, the collector current Ic is increased. On the contrary, as the driving voltage Vx is decreased, the resistance of the variable resistor is increased and, thus, the collector current Ic is decreased. Therefore, the load current in the off state of the switching device Q1 can be increased/decreased by changing the driving voltage Vx by the conversion driving unit 128. Accordingly, the modulation degree can be controlled. Here, the temperature dependency of the resistance of the bipolar transistor (i.e., the temperature dependency of the base-emitter voltage and the collector current) is higher than the temperature dependency of the resistance of the resistor. Therefore, it is also possible to measure a temperature of the modulation resistance circuit 124 (or ambient temperature) by a temperature sensor such as a thermistor or the like and correct the driving voltage Vx based on the measured temperature.

Hereinafter, the operation of the visible light communication of the present embodiment will be described.

In the present embodiment, the visible light communication is performed by modulating a light intensity of the LED light source 200 by a communication signal. SC-4PPM is employed as a modulation method in the visible light communication. In the 4PPM (four pulse position modulation), 2 bit data can be transmitted by dividing a fixed time defined as a symbol time into four slots and inputting a pulse into any one of the four slots. The 4PPM is specifically disclosed in CP-1221 and CP-1222 of JEITA (Japan Electronics and Information Technology Industries Association) standard.

Figure 8A:
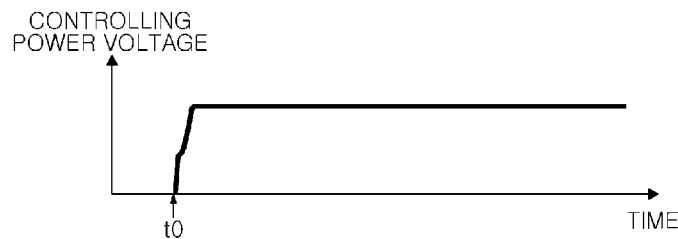
FIG. 8A shows a temporal change of an output voltage of a control power circuit 121.
Figure 8B:
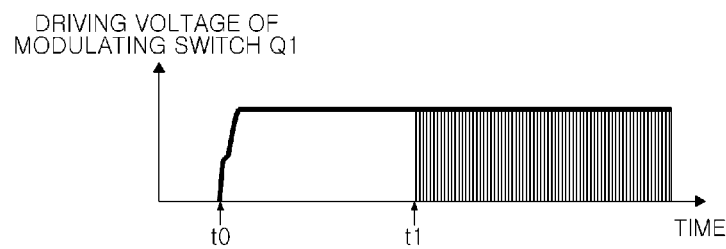
FIG. 8B shows a temporal change of a driving voltage of a modulating switch Q1.
Figure 8C:
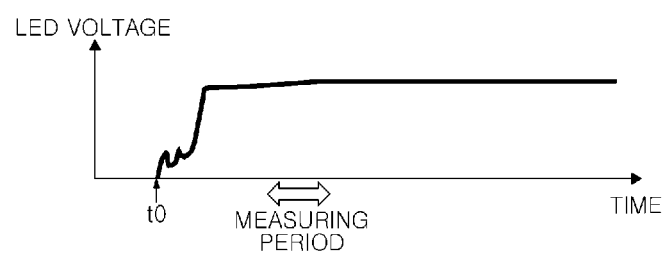
FIG. 8C shows a temporal change of a voltage (LED voltage) applied to the LED light source 200.
Figure 8D:
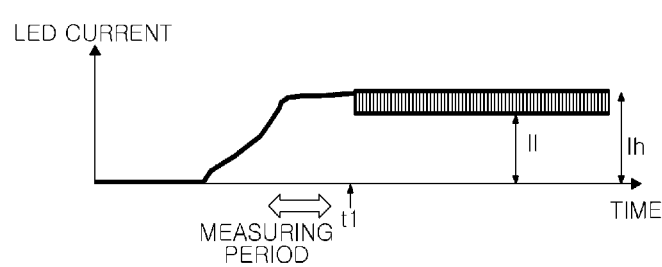
FIG. 8D shows a temporal change of a current (LED current) flowing through the LED light source 200.

FIGS. 8A to 8D show various waveforms of voltages and currents in the present embodiment. FIG. 8A shows a temporal change of an output voltage of the control power circuit 121. FIG. 8B shows a temporal change of a driving voltage of the modulating switch Q1. FIG. 8C shows a temporal change of a voltage (LED voltage) applied to the LED light source 200. FIG. 8D shows a temporal change of a current (LED current) flowing through the LED light source 200.

As shown in FIGS. 8A to 8D, when the power is inputted at the timing t0, the output voltage of the control power circuit 121 becomes a predetermined value and the driving voltage of the switching device Q1 for signal modulation becomes in a high state. Therefore, the LED voltage is increased and the LED current is increased more slowly than the LED voltage. In other words, the LED current is gradually increased compared to the LED voltage. Accordingly, a period of time required until the LED current is stabilized is longer than that required until the LED voltage is stabilized. At the timing t1, the temporal change of the LED current becomes lower than a predetermined threshold value and, thus, the LED current is stabilized. After the temporal change of the LED current becomes lower than the predetermined threshold value, the modulation lighting circuit 120 determines that the LED current has been stabilized and starts communication. At this time, as shown in FIG. 8B, the driving voltage of the switching device Q1 is quickly switched between the high state and the low state based on the communication signal. Accordingly, the state in which both ends of the switching device Q1 of the modulation resistance circuit 124 are opened and the state in which they are short-circuited are switched quickly. A switching frequency may be set to a level (e.g., several tens of kHz to a few MHz) at which a person does not feel flickering.

The visible light communication modulation circuit 120 of the present embodiment controls a modulation degree before the visible light communication is performed. At this time, a modulation resistance is set such that an adequate modulation degree is obtained depending on the LED light source 200.

FIG. 9 is a flowchart showing a modulation degree control operation of the visible light communication modulation circuit 120. When the power of the illumination apparatus 10 is inputted, the voltage measurement circuit 122 and the current measurement circuit 123 simultaneously measure a current and a voltage of the LED light source 200 multiple times (step S201). As shown in FIGS. 8C and 8D, the measurement is executed until the load current is stabilized after the start-up. The measurement may be performed several thousands to several tens of thousands of times.

Next, the V-I characteristic calculation unit 126 obtains an approximate equation of the V-I characteristics by a least square method (step S202). Then, the equivalent series resistance RL of the LED light source 200 is obtained based on the gradient of the approximate equation (step S203).

Figure 10:
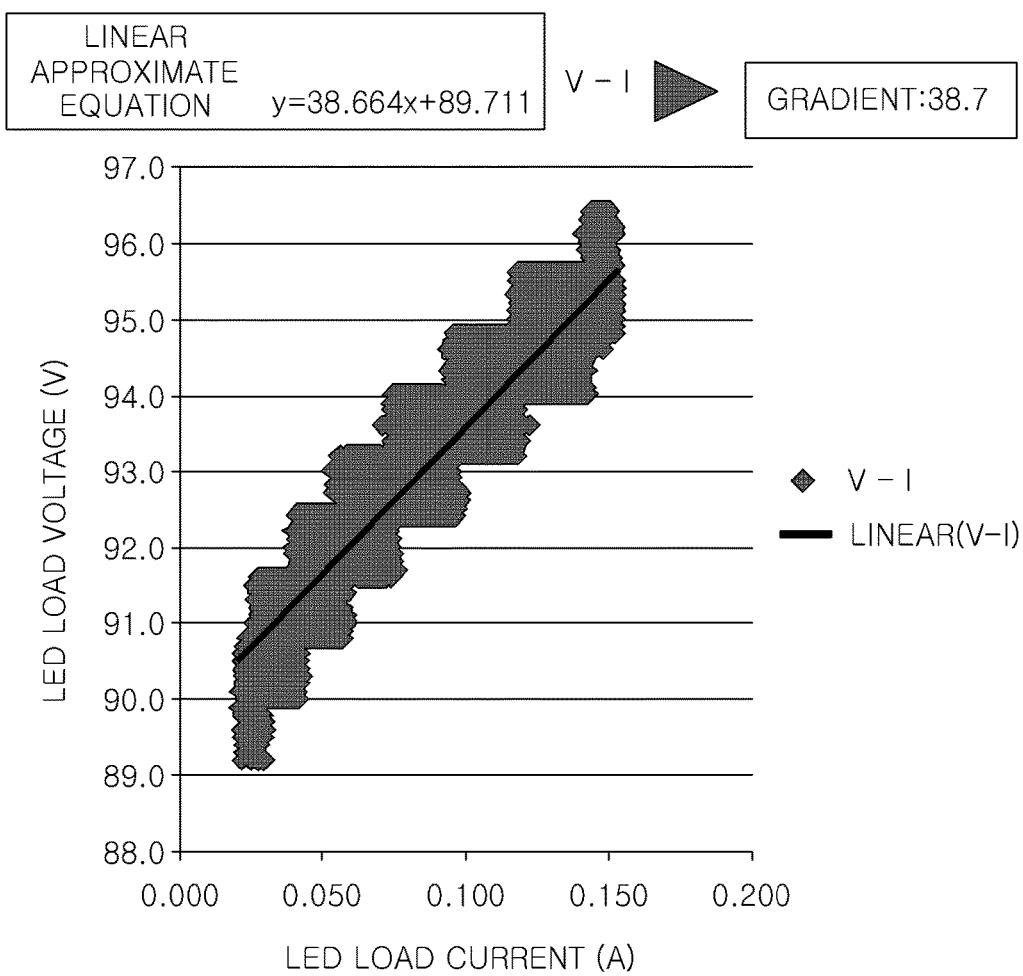
FIG. 10 is a view for explaining a process of obtaining an approximate equation of V-I characteristics and an equivalent series resistance RL.

FIG. 10 is a view for explaining a process of obtaining the approximate equation of the V-I characteristics and the equivalent series resistance RL. FIG. 10 shows an example of a plotted result of the measurement of the load voltage and the load current. In this example, the voltage and the current are measured about 35000 times. The measurement result may have errors. Therefore, in the present embodiment, a linear approximate equation is obtained by using a least square method. In the example shown in FIG. 10, the approximate equation is expressed by y=38.664x+89.711. Accordingly, the equivalent series resistance RL of the LED light source 200 is about 38.7Ω.

As described above, it is not possible to obtain an accurate equivalent series resistance RL in the case of obtaining the gradient with respect to the origin only by using the load voltage and the load current in stable operation. In that case, the obtained gradient is greater than an actual gradient, because a constant voltage (Vd in FIG. 5B) in the equivalent circuit of the LED light source 200 is not considered. Therefore, the obtained gradient cannot be used an approximate value.

The modulation resistance calculation unit 127 calculates a target value of the modulation resistor Rx based on the equivalent series resistance RL and the predetermined modulation degree M by using the following Eq. (3), i.e., Rx=RL×M/(1−M) (step S204).

Next, the conversion driving unit 128 sets the base current Ib of the switching device Q4 so that the resultant resistance of the modulation resistance circuit 124 becomes the target value of Rx (step S205). Thereafter, the conversion driving unit 128 starts modulation operation (communication) (step S206).

With the above-described operation, even in the case of exchanging the LED light source 200, the modulation degree can be automatically set to a predetermined level before the communication is started. In the present embodiment, the same modulation resistance circuit 124 can be used even when the light source is changed to another light source having a different rated current, unlike a conventional method that determines a modulation resistance based on the load voltage in stable operation. As a result, the convenience can be further improved.

In the present embodiment, a dimmable constant current circuit 111 is used for the power circuit 110. However, the configuration of the power circuit 110 is not limited thereto and the same configuration may be realized by using a constant voltage circuit, for example.

In the present embodiment, the load voltage and the load current are measured for a fixed period of time. However, it may vary depending on the operation state. The increase of the LED current may be delayed depending on the characteristics of the power circuit 110. When the measurement period is set to a preset time, a period of time required until the LED current is stabilized may exceed the preset time. In that case, it is not possible to obtain an adequate approximate value. To that end, the approximate value may be obtained based on a measured value obtained before the rate of change of the LED current becomes lower than a predetermined value. At this time, it may be possible to select a period in which an error of the measurement value is relatively small. A more accurate approximate value can be obtained when the approximate equation of the voltage-current characteristics and the equivalent series resistance of the LED light source are obtained based on multiple sets of voltage values and current values measured during such a period.

In the present embodiment, there are separately provided the communication switching device Q1 and the switching device Q4 for controlling an output current of the power circuit 110. However, the switching device Q1 may be omitted. When the modulation frequency (e.g., a few kHz or less) of the load current is sufficiently lower than a switching frequency (e.g., several tens of kHz or above) of the power circuit 110, the switching device Q1 may be omitted. The modulation control of the load current can be performed by the frequency control or the duty control of the switching device Q4 for controlling an output current of the power circuit 110. In such a configuration, the conversion driving unit 128 controls a resistance of the modulation resistance circuit 124 to an adequate level by switching the conducting state of the switching device Q4, i.e., controlling the driving voltage Vx, immediately after the start-up and then switches the conducting state of the switching device Q4 depending on the transmission signal. Since the modulation degree control function and the communication function are realized by a single switching device, the number of components is reduced and the apparatus can be implemented at a low cost.

Second Embodiment

Figure 11:
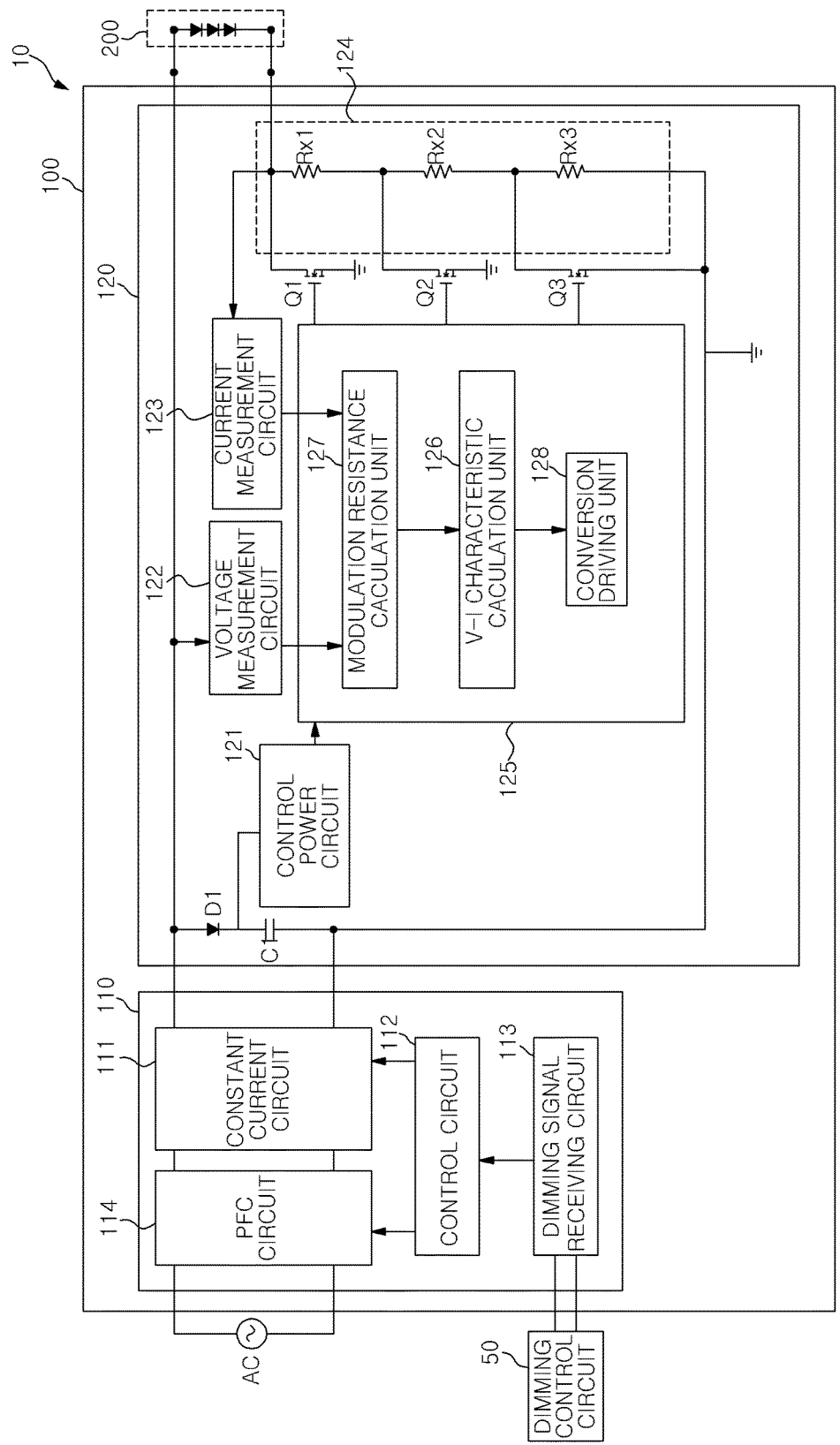
FIG. 11 is a circuit diagram showing a configuration of an illumination apparatus 10 according to a second embodiment.

FIG. 11 is a circuit diagram showing a configuration of an illumination apparatus 10 according to a second embodiment. A modulation resistance circuit 124, a switching device and a current measurement circuit 123 of the second embodiment have different configurations from those of the first embodiment. The conversion driving unit 128 and switching devices Q2 and Q3 correspond to the conversion circuit 120d shown in FIG. 2. Hereinafter, the difference between the first embodiment and the second embodiment will be described and redundant description will be omitted. In the second embodiment, like reference numerals will be used for like parts corresponding to those in the first embodiment.

In the present embodiment, the modulation resistance circuit 124 has resistors Rx1, Rx2, and Rx3 connected in series. The switching device Q1 is connected in parallel to the resistor Rx1. The switching device Q2 is connected in parallel to the resistor Rx2. The switching device Q3 is connected in parallel to the resistor Rx3. Therefore, the modulation degree is minimum when both of the two switching devices Q2 and Q3 are in an on state (or the switching device Q2 is in an on state and the switching device Q3 is in an off state) and is maximum when they are in an off state. The modulation degree is in an intermediate range when the switching device Q2 is in an off state and the switching device Q3 is in an off state.

In the present embodiment, the current measurement circuit 123 measures the load current by using the resistors Rx1, Rx2 and Rx3 of the modulation resistance circuit 124 instead of the resistor Rs. The modulation resistance is converted by switching the switching devices Q2 and Q3. By the switching of the switching devices Q2 and Q3, the series resultant resistance of the modulation resistance circuit 124 can be converted to a value suitable for the LED light source 200.

In the first embodiment, a circuit for correcting a temperature dependency of a DC current amplification factor hFE of the bipolar transistor Q4 is required if a wide temperature range is used. On the other hand, in the present embodiment, the temperature dependency of the resistance is relatively small, because the fixed resistors Rx1, Rx2, and Rx3 are used. Therefore, even when the temperature variation is relatively large, the correction circuit becomes unnecessary. As a result, the circuit can be simplified.

In the second embodiment, the switching device Q1 for communication and the switching devices Q2 and Q3 for controlling an output current of the power circuit 110 may be implemented by using a single switching device. When the modulation frequency of the load current is sufficiently low, it is possible to perform the modulation control of the load current by controlling the switching device Q2 or Q3. By realizing the modulation degree control function and the communication function with a single switching device, the number of components can be reduced and the apparatus can be implemented at a low cost.

The disclosure is not limited to the above-described embodiments and may be variously modified. For example, it is possible to more precisely set the modulation degree by further providing switching devices and resistor elements at the visible light communication modulation circuit 120. The signal processing circuit 125 may be realized by an individual circuit instead of a microcontroller.

The visible light communication modulation circuit of the disclosure simultaneously measures a load voltage and a load current at least twice until the load current is stabilized and then sets the modulation resistance based on the equivalent series resistance of the LED light source obtained from the measurement values. The configuration of the circuit is not limited as long as the above-described operation can be performed.

The visible light communication modulation circuit of the disclosure may be used for an illumination apparatus for visible light communication.

While the disclosure has been shown and described with respect to the embodiments, it will be understood by those skilled in the art that various changes and modifications may be made without departing from the scope of the disclosure as defined in the following claims.

What is claimed is:

1. A visible light communication modulation circuit for use in an illumination device for performing visible light communication, comprising:
   a modulation resistance circuit connected to a power circuit and an LED light source and configured to change a current flowing through the LED light source in response to a change of a resistance of the modulation resistance circuit;
   a measurement circuit configured to simultaneously measure a voltage applied to the LED light source and the current flowing through the LED light source at least twice until the current flowing through the LED light source is stabilized after start-up of the visible light communication modulation circuit;
   a calculation circuit configured to obtain an equivalent series resistance of the LED light source based on at least two sets of voltage values and current values measured by the measurement circuit and determine a target resistance of the modulation resistance circuit based on the equivalent series resistance and a predetermined modulation degree of the current flowing through the LED light source; and a conversion circuit configured to change the resistance of the modulation resistance circuit based on the target resistance determined by the calculation circuit.

2. The visible light communication modulation circuit of claim 1, wherein the measurement circuit simultaneously measures the voltage applied to the LED light source and the current flowing through the LED light source at least twice consecutively after the start-up, and
wherein said at least two sets of voltage values and current values are measured, by the measurement circuit, before a rate of change of the current flowing through the LED light source becomes lower than a predetermined level.

3. The visible light communication modulation circuit of claim 2, wherein the calculation circuit obtains an approximate equation of voltage-current characteristics of the LED light source based on said at least two sets of voltage values and current values and obtains the equivalent series resistance from a gradient of the approximate equation.

4. The visible light communication modulation circuit of claim 3, wherein the calculation circuit obtains the approximate equation of the voltage-current characteristics from said at least two sets of voltage values and current values by using a least square method.

5. The visible light communication modulation circuit of claim 1, wherein the calculation circuit obtains the target resistance of the modulation resistance circuit by using an equation $M=Rx/(Rx+RL)$, where RL indicates the equivalent series resistance, M indicates the predetermined modulation degree, and Rx indicates the target resistance of the modulation resistance circuit.

6. The visible light communication modulation circuit of claim 1, wherein the conversion circuit includes a switching device configured to change the resistance of the modulation resistance circuit and changes the resistance of the modulation resistance circuit through switching a conducting state of the switching device.

7. The visible light communication modulation circuit of claim 6, wherein the conversion circuit changes the resistance of the modulation resistance circuit to a value, closest to the target resistance determined by the calculation circuit, in a range within which the resistance of the modulation resistance circuit is configurable through switching the conducting state of the switching device and then switches the conducting state of the switching device depending on a transmission signal.

8. An illumination device for performing visible light communication, comprising:
a visible light communication modulation circuit; and
a power circuit, connected to the visible light communication modulation circuit, configured to supply power for driving an LED light source,
wherein the visible light communication modulation circuit includes:
a modulation resistance circuit connected to the power circuit and the LED light source and configured to change a current flowing through the LED light source in response to a change of a resistance of the modulation resistance circuit;
a measurement circuit configured to simultaneously measure a voltage applied to the LED light source and the current flowing through the LED light source at least twice until the current flowing through the LED light source is stabilized after start-up of the visible light communication modulation circuit;
an calculation circuit configured to obtain an equivalent series resistance of the LED light source based on at least two sets of voltage values and current values measured by the measurement circuit and determine a target resistance of the modulation resistance circuit based on the equivalent series resistance and a predetermined modulation degree of the current flowing through the LED light source; and
a conversion circuit configured to change the resistance of the modulation resistance circuit based on the target resistance determined by the calculation circuit.

9. An illumination apparatus comprising:
an illumination device configured to perform visible light communication; and
an LED light source attachable to the illumination device,
wherein the illumination device includes:
a visible light communication modulation circuit; and
a power circuit, connected to the visible light communication modulation circuit, configured to supply power for driving the LED light source, and
wherein the visible light communication modulation circuit includes:
a modulation resistance circuit connected to the power circuit and the LED light source and configured to change a current flowing through the LED light source in response to a change of a resistance of the modulation resistance circuit;
a measurement circuit configured to simultaneously measure a voltage applied to the LED light source and the current flowing through the LED light source at least twice until the current flowing through the LED light source is stabilized after start-up of the visible light communication modulation circuit;
an calculation circuit configured to obtain an equivalent series resistance of the LED light source based on at least two sets of voltage values and current values measured by the measurement circuit and determine a target resistance of the modulation resistance circuit based on the equivalent series resistance and a predetermined modulation degree of the current flowing through the LED light source; and
a conversion circuit configured to change the resistance of the modulation resistance circuit based on the target resistance determined by the calculation circuit.

10. A visible light communication system comprising:
an illumination apparatus; and
a receiving unit configured to receive a visible light signal transmitted from the illumination apparatus,
wherein the illumination apparatus includes:
an illumination device configured to perform visible light communication; and
an LED light source attachable to the illumination device,
wherein the illumination device includes:
a visible light communication modulation circuit; and
a power circuit, connected to the visible light communication modulation circuit, configured to supply power for driving the LED light source, and
wherein the visible light communication modulation circuit includes:
a modulation resistance circuit connected to the power circuit and the LED light source and configured to change a current flowing through the LED light source in response to a change of a resistance of the modulation resistance circuit;
a measurement circuit configured to simultaneously measure a voltage applied to the LED light source and the current flowing through the LED light source at least twice until the current flowing through the LED light source is stabilized after start-up of the visible light communication modulation circuit;

an calculation circuit configured to obtain an equivalent series resistance of the LED light source based on at least two sets of voltage values and current values measured by the measurement circuit and determine a target resistance of the modulation resistance circuit based on the equivalent series resistance and a predetermined modulation degree of the current flowing through the LED light source; and a conversion circuit configured to change the resistance of the modulation resistance circuit based on the target resistance determined by the calculation circuit.

* * * * *